US007984731B2

(12) United States Patent
Rajabi et al.

(10) Patent No.: US 7,984,731 B2
(45) Date of Patent: Jul. 26, 2011

(54) LIGHTWEIGHT HIGH PRESSURE REPAIRABLE PISTON TIE ROD COMPOSITE ACCUMULATOR

(75) Inventors: Bahram S. Rajabi, Belvidere, IL (US); Allen R. Hansen, Winnebago, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 264 days.

(21) Appl. No.: 12/270,203

(22) Filed: Nov. 13, 2008

(65) Prior Publication Data

US 2009/0126816 A1 May 21, 2009

Related U.S. Application Data

(60) Provisional application No. 60/987,583, filed on Nov. 13, 2007.

(51) Int. Cl.
*F16L 55/04* (2006.01)

(52) U.S. Cl. .......................................... 138/31; 138/30

(58) Field of Classification Search .................... 138/31, 138/30
See application file for complete search history.

(56) References Cited

U.S. PATENT DOCUMENTS

| | | | | |
|---|---|---|---|---|
| 1,582,985 | A * | 5/1926 | Hanel | 138/31 |
| 1,590,587 | A | 6/1926 | McFarland | |
| 2,052,078 | A * | 8/1936 | Brown | 338/106 |
| 2,411,139 | A * | 11/1946 | Roy et al. | 338/109 |
| 2,734,531 | A | 2/1956 | Bizak | |
| 2,780,065 | A * | 2/1957 | Spannhake | 60/475 |
| 2,789,581 | A * | 4/1957 | Kerr | 138/31 |
| 2,800,924 | A | 7/1957 | Antrim, Jr. | |
| 3,004,560 | A | 10/1961 | Leffler et al. | |
| 3,084,717 | A | 4/1963 | Purcell | |
| 3,171,563 | A | 3/1965 | Bernd | |
| 3,307,730 | A | 3/1967 | Davidson | |
| 3,348,578 | A | 10/1967 | Mercier | |
| 3,490,344 | A | 1/1970 | Archer et al. | |
| 3,581,774 | A | 6/1971 | Oeland, Jr. et al. | |
| 3,847,182 | A | 11/1974 | Greer | |
| 3,863,676 | A | 2/1975 | Tarsha | |
| 4,355,662 | A | 10/1982 | Floyd | |
| 4,386,627 | A | 6/1983 | Lachaux | |
| 4,510,959 | A | 4/1985 | Gidick | |
| 4,561,568 | A | 12/1985 | Hoffmeister et al. | |
| 4,575,422 | A | 3/1986 | Zimmer | |
| 4,603,711 | A | 8/1986 | Porel | |
| 4,644,976 | A | 2/1987 | Peter et al. | |
| 4,714,094 | A | 12/1987 | Tovagliaro | |
| 4,778,073 | A | 10/1988 | Ehs | |

(Continued)

FOREIGN PATENT DOCUMENTS

| | | |
|---|---|---|
| EP | 0 701 065 | 3/1996 |

*Primary Examiner* — James F Hook
(74) *Attorney, Agent, or Firm* — Renner, Otto, Boisselle & Sklar, LLP

(57) ABSTRACT

A lightweight high pressure repairable piston composite tie-rod accumulator that does not use a load bearing metallic liner. An exemplary accumulator includes composite tie rods that sustain the axial stress induced by pressurization of the accumulator, while the shell is designed such that it sustains the stress of pressurization in the hoop direction. The tie rods can be secured using a wedge-type tie rod retention mechanism. As a result, no pretension is applied to the tie rods and the composite shell may be designed entirely for hoop stress.

15 Claims, 1 Drawing Sheet

U.S. PATENT DOCUMENTS

| | | | |
|---|---|---|---|
| 4,823,976 | A | 4/1989 | White, III et al. |
| 4,905,856 | A | 3/1990 | Krogager |
| 4,961,760 | A | 10/1990 | Caskey et al. |
| 4,966,200 | A | 10/1990 | Bents |
| 5,025,943 | A | 6/1991 | Forsman |
| 5,087,409 | A | 2/1992 | Wedellsborg et al. |
| 5,121,852 | A | 6/1992 | Wilkes |
| 5,178,753 | A | 1/1993 | Trabold |
| 5,181,319 | A | 1/1993 | Campbell, Jr. |
| 5,224,621 | A | 7/1993 | Cannan, Jr. et al. |
| 5,253,778 | A | 10/1993 | Sirosh |
| 5,287,987 | A | 2/1994 | Gaiser |
| 5,499,739 | A | 3/1996 | Greist, III et al. |
| 6,332,477 | B1 | 12/2001 | Scholl et al. |
| 6,357,966 | B1 | 3/2002 | Thompson |
| 6,398,382 | B1 | 6/2002 | Boyce et al. |
| 6,401,963 | B1 | 6/2002 | Seal et al. |
| 6,418,970 | B1 | 7/2002 | Deul |
| RE38,163 | E | 7/2003 | Spero |
| 6,834,680 | B2 | 12/2004 | Baugh |
| 6,971,411 | B1 | 12/2005 | Draper |
| 7,048,009 | B2 | 5/2006 | Verhaeghe |
| 7,108,016 | B2 | 9/2006 | Moskalik et al. |
| 7,208,207 | B2 | 4/2007 | Ono et al. |
| 2003/0111473 | A1 | 6/2003 | Carter et al. |
| 2003/0233751 | A1 | 12/2003 | Franks |
| 2004/0026431 | A1 | 2/2004 | Jones |
| 2007/0007405 | A1 | 1/2007 | Al-Mayah et al. |
| 2008/0308168 | A1 | 12/2008 | O'Brien, II et al. |

* cited by examiner

LIGHTWEIGHT HIGH PRESSURE REPAIRABLE PISTON TIE ROD COMPOSITE ACCUMULATOR

RELATED APPLICATIONS

This application claims the benefit of U.S. Provisional Application No. 60/987,583 filed Nov. 13, 2007, which is hereby incorporated herein by reference.

FIELD OF THE INVENTION

The present invention relates generally to a lightweight high pressure repairable piston tie rod composite accumulator.

BACKGROUND OF THE INVENTION

Demand for lightweight accumulators is increasing, especially for mobile applications (e.g., aircraft, motor vehicles, etc.) where extra weight can reduce fuel efficiency. One example of a mobile application of an accumulator is in a hybrid powertrain for a vehicle. The term "Hybrid" generally refers to the combination of one or more conventional internal combustion engines with a secondary power system. The secondary power system typically serves the functions of receiving and storing excess energy produced by the engine and energy recovered from braking events, and redelivering this energy to supplement the engine when necessary. The secondary power system acts together with the engine to ensure that enough power is available to meet power demands, and any excess power is stored for later use. This allows the engine to operate more efficiently by running intermittently, and/or running within its most efficient power band more often.

Several forms of secondary power systems are known. Interest in hydraulic power systems as secondary systems continues to increase. Such systems typically include one or more hydraulic accumulators for energy storage and one or more hydraulic pumps, motors, or pump/motors for power transmission. Hydraulic accumulators operate on the principle that energy may be stored by compressing a gas. An accumulator's pressure vessel contains a captive charge of inert gas, typically nitrogen, which becomes compressed as a hydraulic pump pumps liquid into the vessel, or during regenerative braking processes. The compressed fluid, when released, may be used to drive a hydraulic motor to propel a vehicle, for example. Typically operating pressures for such systems may be between 3,000 psi to greater than 7,000 psi, for example.

As will be appreciated, since the accumulator stores energy developed by the engine or via regenerative braking processes, it plays an important role in achieving system efficiency. One type of accumulator that may be used is commonly referred to as a standard piston accumulator. In a standard piston accumulator, the hydraulic fluid is separated from the compressed gas by means of a piston which seals against the inner walls of a cylindrical pressure vessel and is free to move longitudinally as fluid enters and leaves and the gas compresses and expands.

The piston is typically made of a gas impermeable material, such as steel, that prevents the gas from mixing with the working fluid. Keeping the gas from mixing with the working fluid is desirable, especially in high pressure applications such as hydraulic hybrid systems, to maintain system efficiency and avoid issues related with removing the gas from the working fluid.

In order to maintain a sufficient seal, the dimensional tolerance at the interface between the piston and the inner wall of the cylinder is generally very close. Further, the pressure vessel typically must be extremely rigid and resistant to expansion near its center when pressurized, which would otherwise defeat the seal by widening the distance between the piston and cylinder wall. This has generally eliminated the consideration of composite materials for high pressure piston accumulator vessels like those used in a hybrid system, for example, as composite materials tend to expand significantly under pressure (e.g., about 1/10 of an inch diametrically for a 12 inch diameter vessel at 5,000 psi pressure). Furthermore, the need to assemble the cylinder with a piston inside traditionally requires that the cylinder have at least one removable end cap for use in assembly and repair, rather than the integral rounded ends that are more structurally desirable in efficiently meeting pressure containment demands with composite materials. Composite pressure vessels are not easily constructed with removable end caps.

As a result of the foregoing, standard piston accumulator vessels tend to be made of thick, high strength steel and are very heavy. Standard piston accumulators have a relatively high weight to energy storage ratio as compared to other types of accumulators (e.g., bladder-type accumulators), which makes them undesirable for mobile vehicular applications (as such increased weight would, for example, reduce fuel economy for the vehicle). Therefore, despite their potentially superior gas impermeability, conventional piston accumulators are largely impractical for vehicular applications.

Another known composite accumulator uses an aluminum liner for both the piston travel surface and main liner of the pressure vessel. This design eliminates the need to pressure balance a secondary liner (e.g. by pressurizing the space between the main and secondary liner), but suffers from low fatigue endurance. The low fatigue endurance is usually caused by the difficulty of getting the aluminum liner (or other thin metal liner) to properly load share with the composite. Without the addition of an autofrettage process, this type of accumulator will have exceptionally low fatigue life. With an autofrettage process, the liner will grow erratically along its length making an adequate piston seal on the trapped piston nearly impossible resulting in gas mixing with the working fluid.

As noted, a consideration for accumulators in hydraulic hybrid systems is repairability. Composite bladder accumulators are difficult to construct with removable end caps that would allow repair/replacement of the bladder and/or seals. Thus, in the event of seal failure, the entire accumulator is inoperable and must be discarded. To the degree that lightweight composite accumulators have had low cycle requirements or have been used on equipment that replacement was acceptable (aircraft, military vehicles, etc.), the use of such non-repairable bladder accumulators has been an acceptable practice. Placing lightweight accumulators in systems that are more commercial in nature and in larger numbers, however, makes non-repairable accumulators both financially and environmentally unsound.

U.S. Pat. No. 4,714,094 describes a repairable piston accumulator in which the all of the stresses (e.g., axial and hoop) are designed to be sustained by a composite overwrap. As a consequence of making a large enough opening for repairability and maintaining a thin non-load bearing liner (or minimally load bearing liner), the required primary wrap angle of the composite becomes 55 degrees placing some shear stress into the composite fibers. The shear stress is an undesirable condition and requires a second circumferential wrap to compensate for the stress. Thus, while the accumulator is repairable, the design likely fails to give the fatigue characteristics demanded by current and future uses of lightweight hydraulic accumulators.

Other accumulator designs employ steel tie rods to carry axial stresses during pressurization. Such tie rods are generally secured to end caps on either end of the liner by threaded connections or the like that generally pretension the tie rods. Since the pretension in the tie rods results in compressive stresses being applied to the liner when the accumulator is not pressurized, such designs generally require a load bearing liner capable of handling compressive stresses. Composite liners are not typically capable of handling such compressive stresses.

SUMMARY OF THE INVENTION

The present invention provides a lightweight high pressure repairable piston composite tie-rod accumulator that does not use a load bearing metallic liner. More particularly, an exemplary accumulator includes composite tie rods that sustain the axial stress induced by pressurization of the accumulator, while the shell is designed such that it sustains the stress of pressurization in the hoop direction. In combination with the tie rods, the composite fibers are not placed in shear like those in U.S. Pat. No. 4,714,094, thus avoiding related fatigue issues.

More particularly, the shell (also commonly referred to as a cylinder or liner) of the present invention is open at both ends, with floating heads (end caps) secured to the shell with tie rods attached using a wedge-type tie rod retention mechanism. As a result, no pretension is applied to the tie rods and the composite shell may be designed entirely for hoop stress. The wedge-type retention mechanism further facilitates the use of composite tie rods rather than conventional steel tie rods.

Accordingly, an accumulator comprises a tubular shell having opposite open ends, the shell adapted to carry hoop stress, a pair of floating caps for closing the open ends of the shell, and at least one composite tie rod extending between the floating caps and retaining the floating caps over the open ends of the shell, the at least one composite tie rod adapted to carry axial stress. The at least one tie rod can be secured to at least one of the floating caps with a wedge-type retention mechanism that may include a barrel insertable into a bore of an end cap, the barrel having a wedge receiving face opposite a tie rod receiving face, a barrel passage extending therethrough between the wedge receiving face and the tie rod receiving face, the passage narrowing toward the tie rod receiving face, and a plurality of wedges insertable into the passage, each of the wedges comprising an inner wedge face for defining a tie rod receiving passage in which an end of the at least one tie rod is received, an outer wedge face, opposite the inner wedge face, wherein the barrel and plurality of wedges cooperate to clamp the tie rod with increasing force as the tension on the tie rod increases.

The shell can be a composite shell, which may include a resin coated inner diameter with a composite overwrap. The accumulator can have an operating pressure between about 5,000 PSI to 7,000 PSI, for example. A pressure balanced liner located interior to the shell can be provided, along with a piston supported for sliding axial movement within the accumulator and forming separate chambers within the accumulator. The at least one composite tie rod can be a carbon fiber or steel tie rod, for example.

According to another aspect, an accumulator comprises a tubular shell having opposite open ends, the shell adapted to carry hoop stress, a pair of floating caps for closing the open ends of the shell, and at least one tie rod extending between the floating caps and retaining the floating caps over the open ends of the shell, the at least one composite tie rod adapted to carry axial stress. The at least one tie rod is secured to at least one of the floating caps with a wedge-type retention mechanism.

The at least one tie rod can include a steel tie rod or a composite tie rod. The wedge-type retention mechanism can include a barrel insertable into a bore of an end cap, the barrel having a wedge receiving face opposite a tie rod receiving face, a barrel passage extending therethrough between the wedge receiving face and the tie rod receiving face, the passage narrowing toward the tie rod receiving face, and a plurality of wedges insertable into the passage, each of the wedges comprising an inner wedge face for defining a tie rod receiving passage in which the tie rod is received, and an outer wedge face, opposite the inner wedge face, wherein the barrel and plurality of wedges cooperate to clamp the tie rod with increasing force as the tension on the tie rod increases.

The shell can be a composite shell, such as a resin coated resin coated I.D. with a composite overwrap. The accumulator can have an operating pressure between about 5,000 PSI to 7,000 PSI, for example. A pressure balanced liner located interior to the shell can be provided, and/or a piston supported for sliding axial movement within the accumulator and forming separate chambers within the accumulator.

Further features of the invention will become apparent from the following detailed description when considered in conjunction with the drawings.

DETAILED DESCRIPTION

Figure 1:
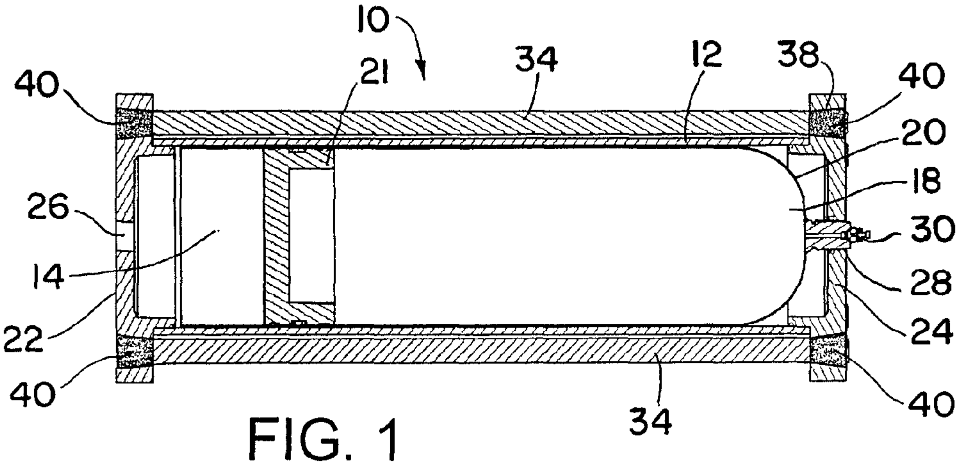
FIG. 1 is cross-sectional view taken along the longitudinal axis of an exemplary accumulator in accordance with the invention.
Figure 2:
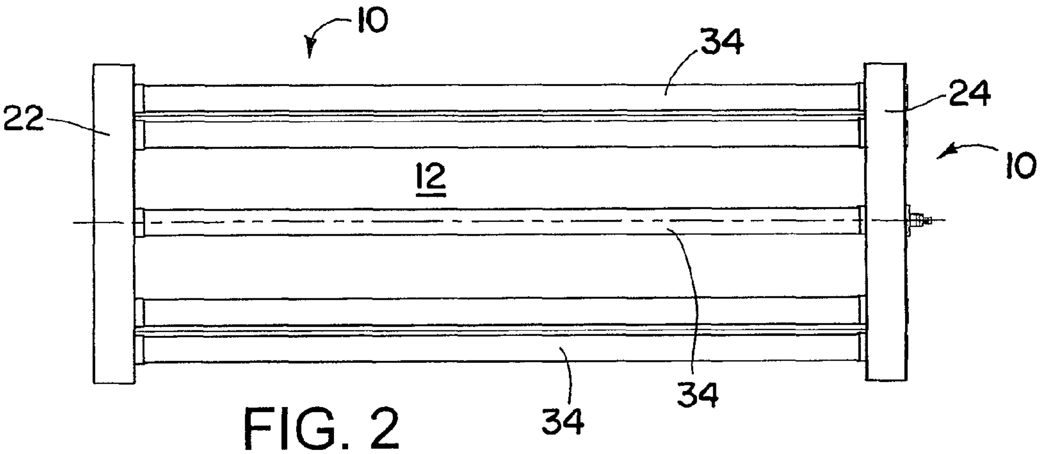
FIG. 2 is a side view of the accumulator of FIG. 1.

Turning now to the drawings, and initially to FIGS. 1 and 2, an exemplary lightweight high pressure repairable hydraulic composite piston tie-rod accumulator 10 is generally indicated by reference numeral 10. The accumulator 10 includes a tubular high strength composite shell 12, also commonly referred to as a cylinder or liner, as an outside pressure boundary. The shell may preferably be constructed of fiber reinforced thermoset epoxy resin carbon fiber tubing. The carbon fiber generally provides the strength to handle the pressure, while the thermoset epoxy resin provides the smooth inside diameter for proper sealing of the piston between gas and fluid.

The shell 12 has opposite open ends 14 and 18. A pressure balanced liner 20 is located interior to the shell 12 in the illustrated embodiment, but it will be appreciated that such pressure balanced liner 20 is optional. A piston 21 is supported for sliding axial movement within the pressure balanced liner 14 during pressurization/depressurization of the accumulator 10.

The ends of the composite shell 12 are closed with floating caps 22 and 24, as shown if FIG. 1. Floating cap 22 has an opening 26 for connecting to a working fluid source, such as a hydraulic circuit, while floating cap 24 has an opening 28 and fitting 30 for connection to an inert gas source for pressurizing the accumulator 10.

Figure 3:
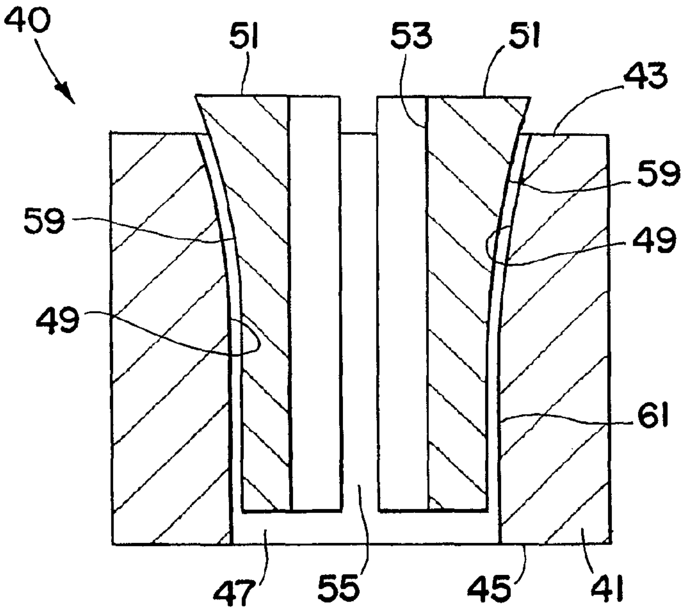
FIG. 3 is an exemplary wedge-type retention mechanism for securing tie rod ends in accordance with the invention.

The floating caps 22 and 24 are secured to the shell 12 over open ends 14 and 18 by tie rods 34 that extend between the floating caps 22 and 24. The tie rods 34 in the illustrated embodiment are formed from a composite material that can include advanced fibers such as carbon and Kevlar that exhibit higher tensile strengths and stiffness than glass fibers, for example, and are attached to the floating caps 22 and 24 using wedge-type retention mechanisms 40, as will be describe in connection with FIG. 3 below. Conventional steel tie rods can also be used instead of the composite tie rods.

As will be appreciated, the tie rods 34 are adapted to carry the axial stress created during pressurization of the accumulator. Unlike conventional threaded tie rods, however, the wedge-type retention mechanisms 40 do not apply preload to the tie rods 34 and, thus, the composite shell 12 is not subject to any compressive loading. Accordingly, the composite shell 12 can be configured solely to carry hoop stresses and can be lightweight. Moreover, the wedge-type retention mechanisms 40 enable use of lightweight composite tie rods further reducing weight.

One type of wedge-type retention mechanism that can be used to secure the tie rods 34 to end caps 22 and 24 is described in detail in U.S. Patent Application Publication 2007/0007405 A1, which is hereby incorporated herein by reference in its entirety. The wedge anchor 40 is comprised of a barrel 41 insertable into a bore (such as bore 38 in end cap 24) that has a wedge receiving face 43, which is opposite a rod receiving face 45. A passage 47 extends through the barrel 41 between the wedge receiving face 43 and the rod receiving face 45 and narrows toward the rod receiving face 45. In an axial cross-sectional profile, the passage 47 defines a convex arc 49. The axial cross-sectional profile of the convex arc is defined by a radius of curvature 61 described as subtended angle less than 0.5 pi radians. The wedge anchor 40 also includes a plurality of wedges 51, which are insertable into the passage 47. Each of the wedges 51 has a respective inner wedge face 53 for defining a tie rod receiving passage 55 in which an end of a tie rod 34 is received (not shown in FIG. 3), and an outer wedge face 59, which is opposite the inner wedge face 53. The outer wedge face 59, in axial cross-section, has a profile complementary to the convex arc 49. Thus, it will be appreciated that the barrel 41 and plurality of wedges 51 cooperate to clamp the tie rod 34 with increasing force as the tension on the tie rod increases during pressurization of the accumulator 10.

The wedge anchor 40 may include as few as two wedges 51, but generally will employ between four and six wedges 51. The wedges 51 generally have a length selected to ensure that they do not extend beyond the rod receiving face 45 of the barrel 41 when the wedge anchor 40 is in its assembled and secured configuration.

The barrel 41 and wedges 51 may be comprised of a hard material, such as a hard metal (e.g., steel), or any hard material known to those skilled in the art may be employed, such as titanium, copper alloys or ceramic materials.

As will be appreciated, composite tie rods may have adequate tensile strength (e.g., equal or greater than steel) but typically have a low transverse compressive strength. As a result, traditional clamping or anchor mechanisms used for steel rods, such as threaded type connections, can crush a composite rod at its load bearing area, which may lead to premature failure of the tie rod at the anchorage point. Failure may also result when the clamping mechanism provides low contact pressure (or a low bond), which would result in the tie rod separating (e.g., pulling out) from the end cap under pressure.

The use of wedge-type retention mechanisms 40 avoids such problems associated with conventional clamping/anchoring mechanisms (e.g., threaded connection), and avoids high pre-stresses on the tie rods 34. As a result, lightweight composite tie-rods 34 can be adapted to carry axial stresses, while the pressure retaining shell 12 only carries hoop stress. In the case of an overwrapped shell, the wind angle of the composite overwrap can be between about 75 and about 90 degrees, for example. As such, the need for a metallic stress carrying liner is avoided (although one may be added for seal considerations). Avoiding any metallic stress carrying liner avoids the fatigue limitations of conventional current accumulator art. By eliminating metal components, fatigue life is enhanced and the overall weight of the accumulator 10 is reduced.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An accumulator comprising:

a tubular shell having opposite open ends, the shell adapted to carry hoop stress;

a pair of floating caps for closing the open ends of the shell; and at least one composite tie rod extending between the floating caps and retaining the floating caps over the open ends of the shell, the at least one composite tie rod adapted to carry axial stress;

wherein the at least one tie rod is secured to at least one of the floating caps with a wedge-type retention mechanism, and the wedge-type retention mechanism includes a barrel insertable into a bore of an end cap, the barrel having a wedge receiving face opposite a tie rod receiving face, a barrel passage extending therethrough between the wedge receiving face and the tie rod receiving face, the passage narrowing toward the tie rod receiving face, and a plurality of wedges insertable into the passage, each of the wedges comprising an inner wedge face for defining a tie rod receiving passage in which an end of the at least one tie rod is received, an outer wedge face, opposite the inner wedge face, wherein the barrel and plurality of wedges cooperate to clamp the tie rod with increasing force as the tension on the tie rod increases.

2. An accumulator as set forth in claim 1, wherein the shell is a composite shell.

3. An accumulator as set forth in claim 2, wherein the composite shell includes a resin coated inner diameter with a composite overwrap.

4. An accumulator as set forth in claim 1, having an operating pressure between about 5,000 PSI to 7,000 PSI, and a lower wall thickness compared to steel shells.

5. An accumulator as set forth in claim 1, further comprising a pressure balanced liner located interior to the shell.

6. An accumulator as set forth in claim 1, further comprising a piston supported for sliding axial movement within the accumulator and forming separate chambers within the accumulator.

7. An accumulator as set forth in claim 1, wherein the at least one composite tie rod is a carbon fiber rod.

8. An accumulator comprising:

a tubular shell having opposite open ends, the shell adapted to carry hoop stress;

a pair of floating caps for closing the open ends of the shell; and at least one tie rod extending between the floating caps and retaining the floating caps over the open ends of the shell, the at least one composite tie rod adapted to carry axial stress;

wherein the at least one tie rod is secured to at least one of the floating caps with a wedge-type retention mechanism, and the wedge-type retention mechanism includes a barrel insertable into a bore of an end cap, the barrel having a wedge receiving face opposite a tie rod receiving face, a barrel passage extending therethrough between the wedge receiving face and the tie rod receiving face, the passage narrowing toward the tie rod receiving face, and a plurality of wedges insertable into the passage, each of the wedges comprising an inner wedge face for defining a tie rod receiving passage in which the tie rod is received, and an outer wedge face, opposite the inner wedge face, wherein the barrel and plurality of wedges cooperate to clamp the tie rod with increasing force as the tension on the tie rod increases.

9. An accumulator as set forth in claim 8, wherein the at least one tie rod includes a steel tie rod.

10. An accumulator as set forth in claim 8, wherein the at least one tie rod includes a composite tie rod.

11. An accumulator as set forth in claim 8, wherein the shell is a composite shell.

12. An accumulator as set forth in claim 11, wherein the composite shell includes a resin coated I.D. with a composite overwrap.

13. An accumulator as set forth in claim 8, having an operating pressure between about 5,000 PSI to 7,000 PSI, and a lower wall thickness compared to steel shells.

14. An accumulator as set forth in claim 8, further comprising a pressure balanced liner located interior to the shell.

15. An accumulator as set forth in claim 8, further comprising a piston supported for sliding axial movement within the accumulator and forming separate chambers within the accumulator.

* * * * *